Figure 1:
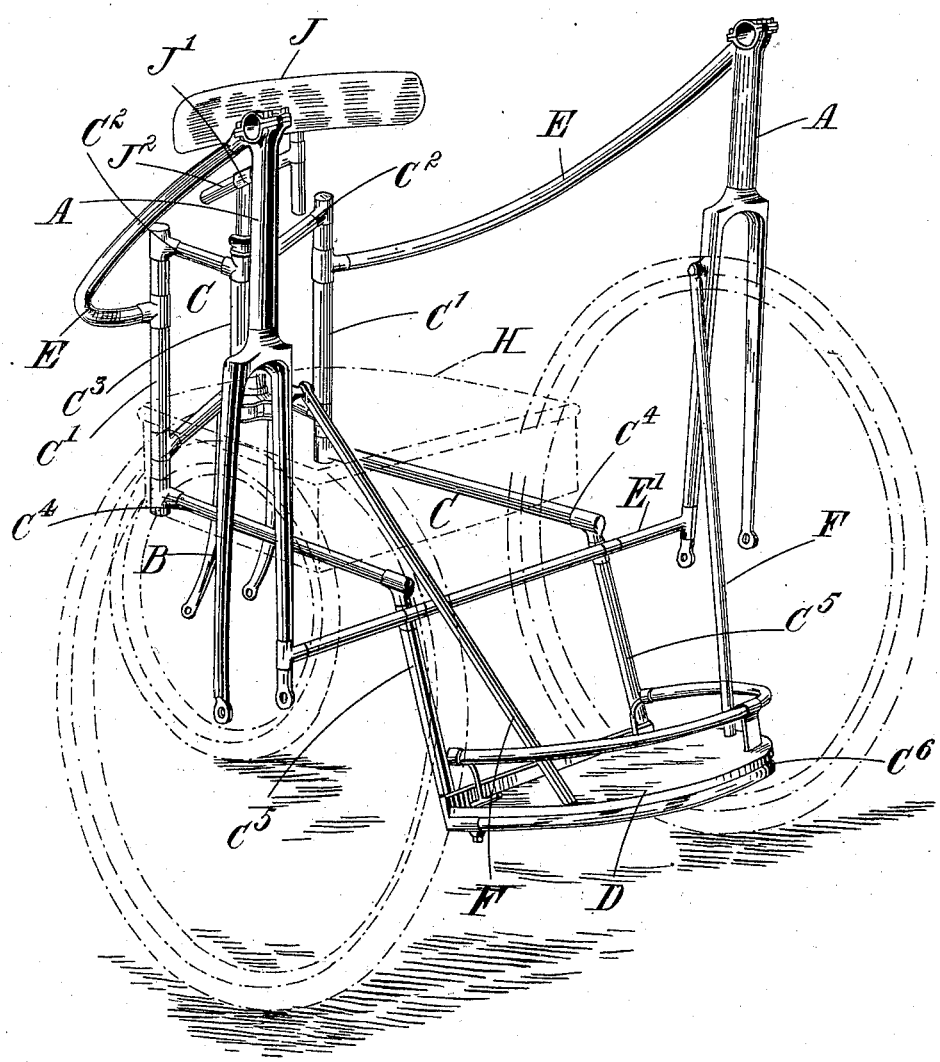

No. 692,036. Patented Jan. 28, 1902.
N. A. SAWYER.
HAND PROPELLED CHAIR.
(Application filed Sept. 23, 1901.)

(No Model.) 2 Sheets—Sheet 1.

Witnesses
H. K. Boulter

Inventor
Norton A. Sawyer
By Wm. R. Boulter,
Attorney

No. 692,036. Patented Jan. 28, 1902.
N. A. SAWYER.
HAND PROPELLED CHAIR.
(Application filed Sept. 23, 1901.)

(No Model.) 2 Sheets—Sheet 2.

United States Patent Office.

NORTON ARTHUR SAWYER, OF LOWESTOFT, ENGLAND.

HAND-PROPELLED CHAIR.

SPECIFICATION forming part of Letters Patent No. 692,036, dated January 28, 1902.

Application filed September 23, 1901. Serial No. 76,190. (No model.)

*To all whom it may concern:*

Be it known that I, NORTON ARTHUR SAW-YER, a subject of the King of England, residing at Lowestoft, England, have invented a certain new and useful Hand-Propelled Chair, (for which I have made application for Letters Patent in Great Britain under No. 22,874, dated December 14, 1900,) of which the following is a specification.

This invention relates to cycles, invalid-chairs, and the like, and has for its object to construct a cycle adapted to be propelled by hand-power by persons unable to use their legs.

According to this invention I construct a cycle having conveniently three wheels, of which two are larger than the other. In the preferred form of construction the two larger wheels are carried in forks, which form part of a framing supported at the rear by the smaller wheel, which is carried in a fork mounted in a head, so as to serve for steering purposes. Besides the three forks carrying the wheels the frame comprises two members which pass from the side forks backwardly to a specially-shaped frame composed of three preferably parallel members disposed more or less vertically. The central member comprises the head, through which the steering-tube passes. The three members are connected together by lengths of tube conveniently inclined from the lateral members to the middle one, which may be made shorter than the former. The lateral members of this rear portion of the frame are extended downwardly and forwardly, so as to serve as a support for a suitable seat, their extremities terminating in a foot-rest, the sides of which are connected by tubes or rods to the lateral forks. These forks are also connected together by a horizontal tube, which may or may not be connected to the tubular members referred to above, which support the seat and foot-rest. The lateral members of the rear frame may be extended upwardly and shaped so as to carry a handle to enable the cycle to be pushed from behind by a pedestrian. The steering is effected by a back piece mounted adjustably upon the upper end of the steering-tube. The adjustment of this back piece may be such as to enable it to be moved forward or backward and upward or downward, so that the leverage may be varied and the height of the back piece fitted to the occupant of the cycle.

The seat may be either a plain flat padded or other surface, or a seat combined with a foot-rest formed of basket or wicker-work may be mounted upon the frame, the back piece, by which the steering is effected, being carried through an opening in the back of the basket-chair.

The cycle is propelled by means of crank-handles mounted upon axles carried on the upper ends of the lateral frame-forks. Each crank-axle carries a toothed wheel, which is connected by a chain with a pinion mounted upon the hub of each lateral wheel. The driving-wheels may be driven separately or connected together conveniently with differential gearing disposed in the connection. Preferably the wheels are independent, so that the steering may be assisted, or even altogether effected, by ceasing to propel one wheel and continuing to drive the other.

Figure 2:
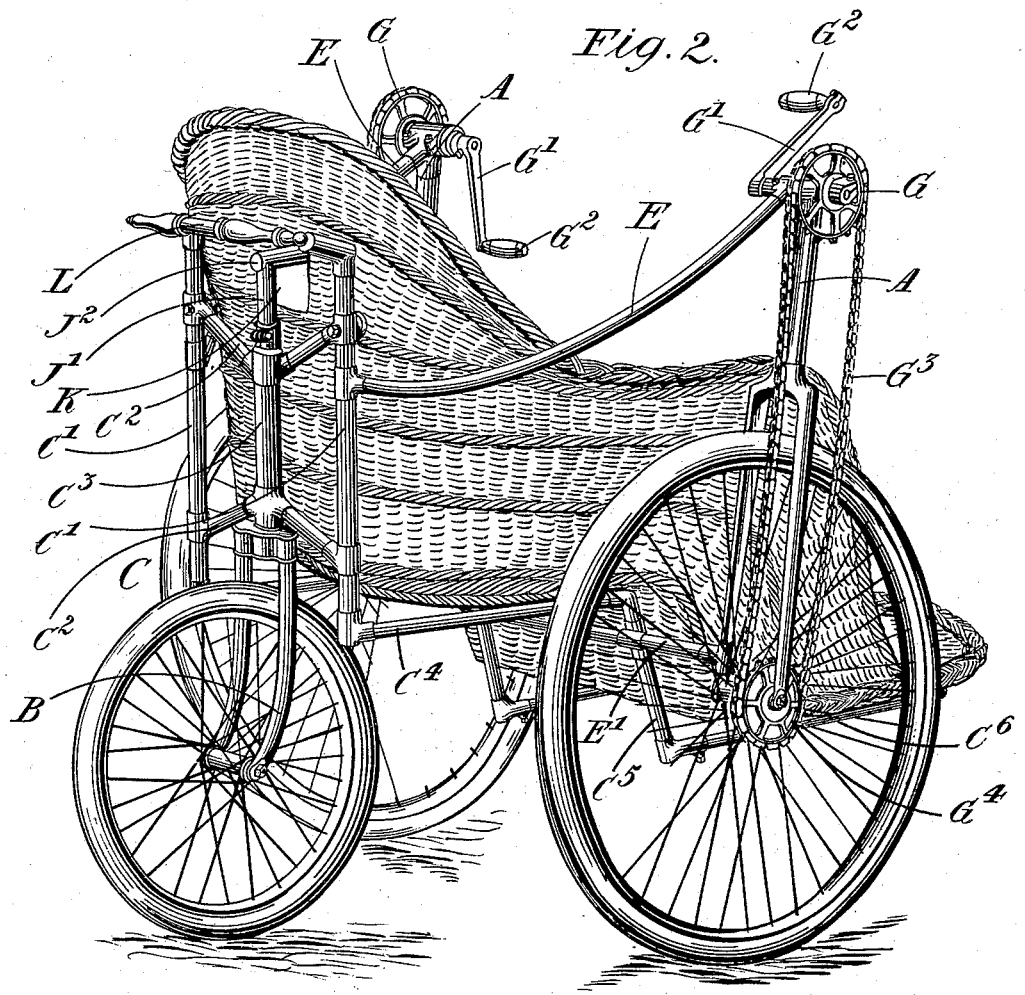

In the accompanying drawings, Figure 1 is a perspective view of the frame of a cycle or invalid-chair constructed according to one method of carrying out this invention, and Fig. 2 is a perspective view of a slightly-modified construction of chair.

Like letters indicate like parts throughout the accompanying drawings.

The cycle or chair shown in the drawings is provided with three wheels, two large wheels being arranged one on either side of the machine and carried in forks A and a small wheel at the rear of the machine, carried in a steering-fork B. The side forks A and steering-fork B are connected to a central frame C, comprising two upright members C', connected by transverse members C² to a third upright member C³, preferably arranged parallel to the members C'. The lower ends of the members C' are carried horizontally forward at C⁴ and downwardly extended at C⁵ to a footboard D. The footboard D may be secured in any convenient manner to the downwardly-extending portions C⁵ of the central frame C, but is preferably carried by a curved member $C^6$, rigidly secured to the ends of the portions $C^5$.

The forks A are each secured to the central member C by a curved arm E, preferably connected at one end to the top of the fork and at the other end to one of the members C' a little below the upper members $C^2$. The parts E thus form upwardly and outwardly curved members or brackets from the central frame C. The lower ends of the forks A are connected together by a brace E', which passes in front or behind the parts $C^5$ of the central frame C, to which it is preferably secured. The brace E' is secured to the forks A above the axles of the wheels; but, if preferred, it may be set in line with the axles and the axles formed on or secured to its ends. The brace may be detachably secured to the frame C or rigidly secured in front or behind the members $C^5$, as stated above, or made in several parts connected to cross-sockets let into the members $C^5$.

The footboard D is further supported by ties F, secured at their upper ends to the forks A and at their lower ends to the footboard.

A chain-wheel G is mounted in a bearing at the top of each fork A and provided with a crank and handle G' $G^2$, respectively, of any convenient construction. Each chain-wheel G is connected by a chain $G^3$ to sprocket-wheel $G^4$ on each of the wheels carried in the forks, so that when the chain-wheels G are rotated by means of the handles $G^2$ the wheels in the forks A will be made to revolve and propel the chair. The side wheels are preferably mounted independently, as shown in the drawings; but they may, if desired, be mounted upon a revolving axle provided with differential gear. The brace E' is fixed to the forks in the manner above stated and may be secured to the members $C^5$ or be curved from a central point or from the members $C^5$.

A seat of any convenient kind may be secured to the horizontal part $C^4$ of the central frame C—such as, for instance, a cushion H. (Shown in dotted lines in Fig. 1.)

Steering is effected by means of a movable back J, against which the back of the operator rests. The back J is secured to a stem J' of the steering-fork B, which is carried in bearings in the central upright member $C^3$ of the frame C. The back J is preferably connected to the stem J' by an approximately horizontal adjustable support $J^2$, so that the forward position of the back may be adjusted, and means may also be provided for adjusting the height of the back.

In place of the cushion-seat H a wicker chair, such as that shown in Fig. 2 of the drawings, may be mounted upon the frame C, in which case the back J operates through an orifice K in the back of the chair. The footboard in this case may be made in one with the chair, and the ties F may, if desired, be dispensed with.

A handle L may conveniently be secured to the upper ends of the members C' of the frame C, as shown in Fig. 2, so that the chair may be wheeled from behind, if desired.

What I claim as my invention, and desire to secure by Letters Patent, is—

1. In a hand-propelled chair the combination of three upright members arranged parallel to each other in an approximately vertical plane common to all the members, cross members connecting the upright members, two approximately horizontal members extending from the lower ends of the two outside upright members, a seat upon these members, downwardly-directed extensions at the free ends of the horizontal members, a footboard secured to these extensions, upwardly and outwardly curved members secured one to each of the outside upright members, a wheel-support secured at the free end of each outwardly-curved member, a road-wheel mounted in each support, a brace connecting the lower ends of the two supports driving-gear mounted at the upper end of each support and connected with the road-wheel of each support and a steering-wheel mounted at the opposite end of the chair to the side-wheel supports as set forth.

2. In a hand-propelled chair the combination of three upright members arranged parallel to each other in an approximately vertical plane common to all the members, cross members connecting the upright members, two approximately horizontal members extending from the lower ends of the two outside upright members, a seat upon these members, downwardly-directed extensions at the free ends of the horizontal members, a footboard secured to these extensions, upwardly and outwardly curved members secured one to each of the outside upright members, a wheel-support secured at the free end of each outwardly-curved member, a road-wheel mounted in each support, a brace connecting the lower ends of the two supports, and also connected to the downwardly-directed extensions of the horizontal members, driving-gear mounted at the upper end of each support and connected with the road-wheel of each support and a steering-wheel mounted at the opposite end of the chair to the side-wheel supports as set forth.

3. In a hand-propelled chair the combination of three upright members arranged parallel to each other in an approximately vertical plane common to all the members, cross members connecting the upright members, two approximately horizontal members extending from the lower ends of the two outside upright members, a seat upon these members, downwardly-directed extensions at the free ends of the horizontal members, a footboard secured to these extensions, upwardly and outwardly curved members secured one to each of the outside upright members, a wheel-support secured at the free end of each outwardly-curved member, a road-wheel mounted in each support, a brace connecting the lower ends of the two supports, ties connecting the supports and the footboard, driving-gear mounted at the upper end of each support and connected with the road-wheel of each support and a steering-wheel mounted at the opposite end of the chair to the side-wheel supports as set forth.

In testimony whereof I have signed my name to this specification in the presence of two subscribing witnesses.

NORTON ARTHUR SAWYER.

Witnesses:
HARRY B. BRIDGE,
G. G. TALMONDTT.